United States Patent
Birchler et al.

(12)

(10) Patent No.: US 12,054,006 B2
(45) Date of Patent: Aug. 6, 2024

(54) BRAKING ASSEMBLY FOR A CASTER BASE

(71) Applicant: Reliance Medical Products, Mason, OH (US)

(72) Inventors: Terry M. Birchler, Gahanna, OH (US); Erik M. Turocy, Gahanna, OH (US)

(73) Assignee: Reliance Medical Products, Mason, OH (US)

( * ) Notice: Subject to any disclaimer, the term of this patent is extended or adjusted under 35 U.S.C. 154(b) by 596 days.

(21) Appl. No.: 17/287,695

(22) PCT Filed: Oct. 25, 2019

(86) PCT No.: PCT/US2019/058069
§ 371 (c)(1),
(2) Date: Apr. 22, 2021

(87) PCT Pub. No.: WO2020/086966
PCT Pub. Date: Apr. 30, 2020

(65) Prior Publication Data
US 2021/0394558 A1    Dec. 23, 2021

Related U.S. Application Data

(60) Provisional application No. 62/750,794, filed on Oct. 25, 2018.

(51) Int. Cl.
*B60B 33/00* (2006.01)
*B60B 33/02* (2006.01)
*A47C 7/00* (2006.01)

(52) U.S. Cl.
CPC ........ *B60B 33/021* (2013.01); *B60B 33/0078* (2013.01); *A47C 7/006* (2013.01)

(58) Field of Classification Search
CPC .............. B60B 33/021; B60B 33/0073; B60B 33/0078; B60B 33/0092; A47C 7/006
(Continued)

(56) References Cited

U.S. PATENT DOCUMENTS 4,722,114 A * 2/1988 Neumann ............. B60B 33/021
16/35 R
6,089,593 A * 7/2000 Hanson ................ A61G 7/0528
297/85 L
(Continued)

FOREIGN PATENT DOCUMENTS

CL    201100681 A1    3/2011
JP    2011098657 A    5/2011
(Continued)

OTHER PUBLICATIONS

Chilean Patent Office; Examiner's Search Report of corresponding application 202101031; Submission Date: Sep. 20, 2022.

*Primary Examiner* — Christopher P Schwartz
(74) *Attorney, Agent, or Firm* — TAFT STETTINIUS & HOLLISTER LLP; Derek B. Lavender; Ryan O. White

(57) ABSTRACT

A caster braking assembly that has a base section, a first caster assembly coupled to the base section and having at least one wheel, a second caster assembly coupled to the base section and having at least one wheel and a brake switch pivotally repositionable between an engaged position and a disengaged position. When the brake switch is in the engaged position at least one wheel of both the first caster assembly and the second caster assembly are substantially restricted from rotating.

19 Claims, 4 Drawing Sheets

(58) Field of Classification Search
USPC .......................................... 188/1.12; 16/35 R
See application file for complete search history.

(56) References Cited

U.S. PATENT DOCUMENTS

| | | | |
|---|---|---|---|
| 7,992,254 B2* | 8/2011 | Ahn | B60B 33/0073 |
| | | | 16/35 R |
| 8,516,656 B2* | 8/2013 | Lin | B60B 33/0092 |
| | | | 188/29 |
| 9,579,241 B2* | 2/2017 | Spoor | B60B 33/0092 |
| 10,245,886 B2* | 4/2019 | Kloss | A61G 5/101 |
| 11,173,747 B2* | 11/2021 | Renno | B62B 9/082 |
| 2010/0122430 A1 | 5/2010 | Ahn et al. | |
| 2013/0111664 A1 | 5/2013 | Childs et al. | |
| 2013/0174377 A1 | 7/2013 | Lin | |
| 2017/0100962 A1 | 4/2017 | Kloss et al. | |

FOREIGN PATENT DOCUMENTS

| | | |
|---|---|---|
| KR | 20000020166 U | 11/2000 |
| WO | 2017028035 A1 | 2/2017 |

* cited by examiner

BRAKING ASSEMBLY FOR A CASTER BASE

CROSS-REFERENCE TO RELATED APPLICATIONS

The present disclosure claims the benefit of U.S. Provisional Application No. 62/750,794 filed on Oct. 25, 2018, the contents of which are hereby incorporated herein in their entirety.

TECHNICAL FIELD

The present disclosure is generally related to a braking assembly for a wheeled seat and more particularly to a braking assembly that applies a braking force to multiple wheels simultaneously.

BACKGROUND

Wheeled seats are commonly used in environments ranging from business offices to surgical rooms. Wheeled seats often use caster wheels that are pivotal to a plurality of directions to allow the seat to move easily in any direction. Often, many caster wheels are used for a wheeled seat to ensure that the seat will roll in any direction and remain stable for the user to sit thereon.

Some wheeled seats implement brakes on one of the caster wheels to prevent movement. These brakes are typically applied on the wheel individually. If the user applies the brakes of only one of the caster wheels, the seat can often still move or otherwise pivot around the locked wheel. To address this issue, the user must separately apply the brakes of multiple caster wheels individually to ensure the seat will not substantially move once locked. Further, unlocking the wheeled seat requires the user to separately identify which of the caster wheels are locked and disengage the lock on each of the caster wheels individually.

SUMMARY

The present disclosure relates to a brake assembly that has an engagement switch and at least one linkage that allows the engagement switch to engage and disengage a locking mechanism on more than one wheel assembly simultaneously.

One embodiment of this disclosure is a caster braking assembly that has a base section, a first caster assembly coupled to the base section and having at least one wheel, a second caster assembly coupled to the base section and having at least one wheel, and a brake switch pivotally repositionable between an engaged position and a disengaged position. Wherein, when the brake switch is in the engaged position at least one wheel of both the first caster assembly and the second caster assembly are substantially restricted from rotating.

One example of this embodiment has a switch arm coupled to the brake switch to pivot about a brake switch axis as the brake switch transitions between the engaged and disengaged position. One aspect of this example has a pushrod pivotally coupled to the switch arm at one portion and pivotally coupled to a cross member at another portion. In part of this aspect, the cross member is coupled to a first brake engagement assembly of the first caster assembly and to a second brake engagement assembly of the second caster assembly to selectively apply brakes to the corresponding wheels of the first and second caster assembly when the brake switch is in the engaged position. In one element of this part, the first and second brake engagement assemblies are pivotal about a brake axis and the cross member is offset from the brake axis.

Another example of this embodiment has a catch mechanism that selectively maintains the brake switch in the engaged position. Yet another example has a support column and a seat section coupled to the base section. One aspect of this example includes a back section.

Another embodiment is a method for manufacturing a braking wheeled assembly. The method includes providing a plurality of caster assemblies pivotally coupled to a base section, a brake switch, and linkages, pivotally coupling the brake switch to the base section to allow the brake switch to pivot between and engaged and disengaged position, and coupling the linkages between the brake switch and at least two of the plurality of caster assemblies to selectively engage brakes for each of the at least two plurality of caster assemblies when the brake switch is in the engaged position.

One example of this embodiment includes selectively coupling a catch mechanism to the brake switch to selectively maintain the brake switch in the engaged position. In another example the linkages comprise a pushrod, a cross member, a first brake engagement assembly, and a second brake engagement assembly. One aspect of this example includes pivotally coupling the pushrod to the brake switch to move in a substantially linear direction as the brake switch transitions between the engaged and disengaged position and pivotally coupling the pushrod to the cross member to pivot the cross member about a brake axis that is offset from the cross member as the brake switch transitions between the engaged and disengaged position. In part of this example, the first and second brake engagement assemblies are coupled to the cross member so pivotal movement of the cross member rotates both the first and second brake engagement assemblies. In one consideration for this part each of the brake engagement assemblies have an operating tool defined along the brake axis and the operating tool of the first brake engagement assembly is positioned partially within a first caster assembly and the operating tool of the second brake engagement assembly is positioned partially within a second caster assembly wherein as the brake switch transitions from the disengaged position to the engaged position the operating tools rotate to engage brakes of the corresponding first and second caster assembly.

Another example of this embodiment includes coupling a return spring to the linkages to apply a spring force to bias the brake switch towards the disengaged position. Yet another example includes pivotally coupling a front caster assembly to the base section at a location at least partially under the brake switch.

Yet another embodiment of the present disclosure is a surgical seat that has a seat section configured to support a user facing a front direction, a base section configured to selectively roll along an underlying surface, a support column coupling the base section to the seat section, the support column configured to be telescopically reconfigurable to alter the spacing of the seat section from the base section, a front caster assembly pivotally coupled to the base section and extending in the front direction, a first rear caster assembly pivotally coupled to the base section and configured to selectively brake a first caster wheel, a second rear caster assembly pivotally coupled to the base section and configured to selectively brake a second caster wheel, and a brake switch pivotally coupled to the base to be repositionable between an engaged position and a disengaged position.

Wherein, when the brake switch is in the engaged position, brakes are applied to both the first caster wheel and the second caster wheel.

One example of this embodiment includes linkages coupling the brake switch to the brakes of the first and second rear caster assemblies, wherein pivoting the brake switch from the disengaged position to the engaged position applies a torque to the first and second rear caster assemblies via the linkages to apply the corresponding brakes. Yet another example includes first and second seat position pedals pivotally coupled to the base section to selectively alter the length of the support column, wherein the brake switch is positioned between the first and second seat position pedals. In yet another example, the brake switch is positioned at least partially above the front caster assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a partial view of a braking assembly of the rolling seat of FIG. 1a;

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

In this regard, the disclosure is illustrated in the several figures, and is of sufficient complexity that the many parts, interrelationships, and sub-combinations thereof simply cannot be clearly or meaningfully illustrated in a single patent-type drawing. Accordingly, several of the drawings show in schematic, or omit, parts that are not essential in that drawing to a description of a particular feature, aspect or principle of the disclosure. Thus, the best mode of one embodied feature may be shown in one drawing, and the best mode of another feature will be called out in another drawing.

Figure 1B:
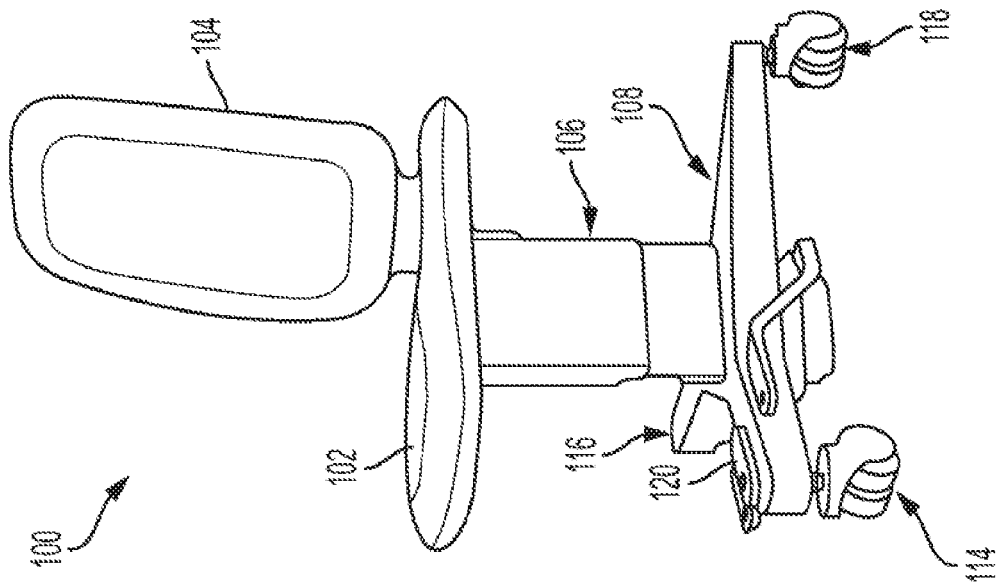
FIG. 1b is an elevated perspective view of the rolling seat of FIG. 1a with the brake switch in an engaged position.
Figure 1A:
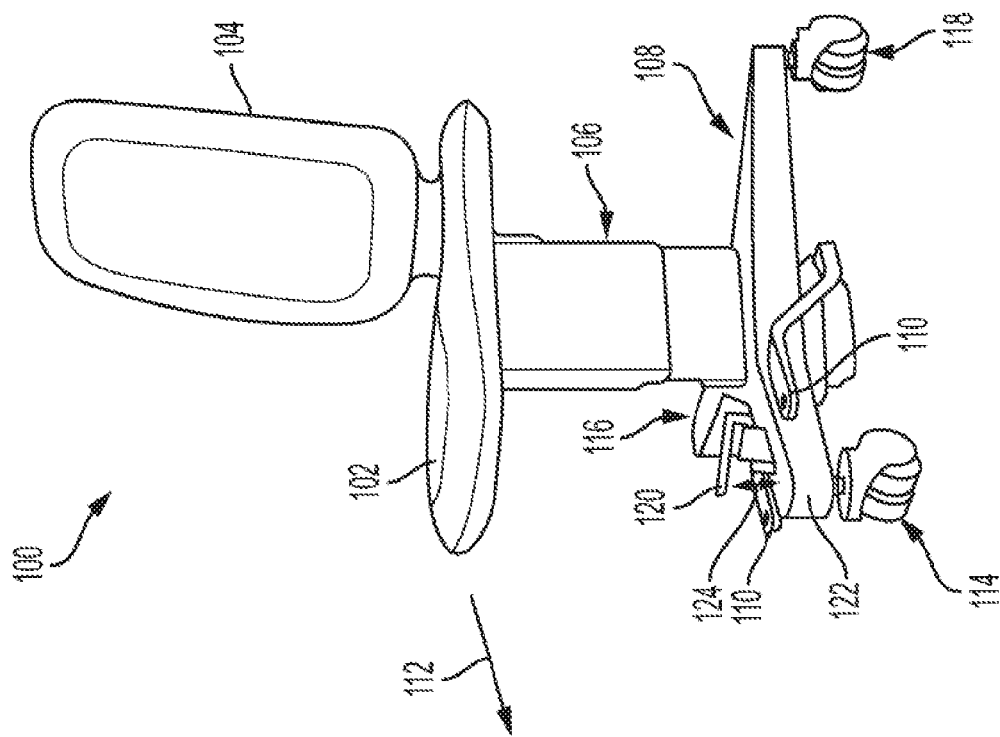
FIG. 1a is an elevated perspective view of a rolling seat with a brake switch in a disengaged position.

Referring now to FIGS. 1a and 1b, a wheeled seat 100 is illustrated. The wheeled seat 100 may have a substantially horizontal seat section 102 and a substantially vertical back section 104. While a back section 104 is shown and illustrated herein, this disclosure also contemplates embodiments that do not have a back section 104 at all. In this configuration, the seat section 102 may be utilized like a stool.

The wheeled seat 100 may have a support column 106 that couples the seat section 102 to a base section 108. The support column 106 may telescopically couple the seat section 102 to the base section 108 and selectively reposition a height of the seat portion 102 relative to the base section 108. In one aspect of this disclosure, the length of the support column 106, and in turn the height of the seat section 102, may be altered utilizing seat positioning pedals 110. The seat positioning pedals 110 may be positioned proximate to the user's feet as the user sits on the seat portion and faces a forward direction 112.

The base section 108 may have a front caster assembly 114 and a first and second rear caster assembly 116, 118. While the base section 108 is illustrated having three caster assemblies 114, 116, 118, this disclosure also contemplates embodiments wherein the base section has more than three caster assemblies. More specifically, one embodiment may have four caster assemblies while another embodiment may have five caster assemblies on the base section. Further still, yet another embodiment may have more than five caster assemblies as part of the base section. Accordingly, this disclosure considers any number of caster assemblies as part of the base section.

In FIG. 1a, a brake switch 120 is illustrated in a disengaged orientation and in FIG. 1b the brake switch 120 is illustrated in the engaged position. When the brake switch 120 is in the disengaged position, all the caster assemblies 114, 116, 118 may be free to both rotate about respective caster axes and roll on caster wheels. However, when the brake switch 120 is in the engaged position, at least two of the caster assemblies 114, 116, 118 may have a braking force applied thereto. The braking force may inhibit one or both of the rotation of the corresponding caster wheel about the caster axis and the rolling of any wheels coupled to the braked caster. In one non-exclusive example, when the brake switch 120 is engaged, a braking force is applied to both the first and second rear caster assembly 116, 118 to resist both rotation about the corresponding caster axis and rolling on the corresponding wheel.

By braking at least two of the caster assemblies 114, 116, 118 when the brake switch 120 is engaged, the user may easily substantially restrict the wheeled seat 100 from moving relative to an underlying surface by actuating the singe brake switch 120. More specifically, since the brake switch 120 engages two of the caster assemblies 116, 118, the wheeled seat 100 is substantially restricted from any movement relative to the underlying surface.

In another aspect of this disclosure, the brake switch 120 may be conveniently positioned along a portion of the base section 108 that is positioned between the user's feet. More specifically, the brake switch 120 may be positioned on a central caster support 122 that extends along a substantially central vertical plane defined through a central portion of the seat section 102. In this orientation, when the user sits in the seat section 102 facing the forward direction 112, the user will naturally place a foot on either side, or in front of, the central caster support 122. Accordingly, the brake switch 120 will be position close to the user's feet for easy actuation between the engaged and disengaged orientation.

In one aspect of this disclosure, the seat section 102 may be rotationally coupled to the base section 108. That is to say, the base section 108 rotates with the seat section 102. Accordingly, the central caster support 122, and in turn the brake switch 120, may remain proximate to the user's feet even after the user rotates the wheeled seat 100.

The brake switch 120 may also move a minimal displacement 124 between the engaged and disengaged position. The minimal displacement 124 may be a distance that allows the user to easily transition the brake switch 120 between the disengaged and engaged state without requiring substantial movement of the user's leg. This may be advantageous in situations wherein the user's leg is positioned proximate to or under a device such as an operating table or chair. The minimal displacement 124 may allow the user to transition the brake switch 120 between the disengaged and engaged positioned while the user's leg remains proximate to, or under, the operating table or chair.

Figure 2:
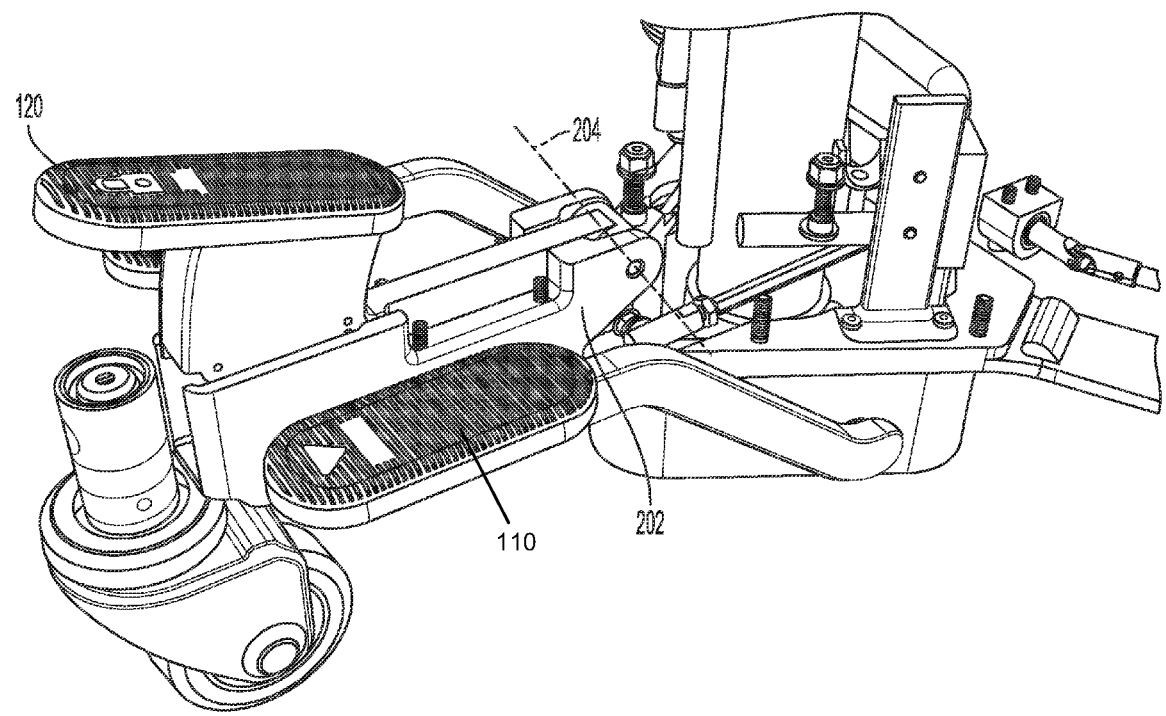
Figure 3:
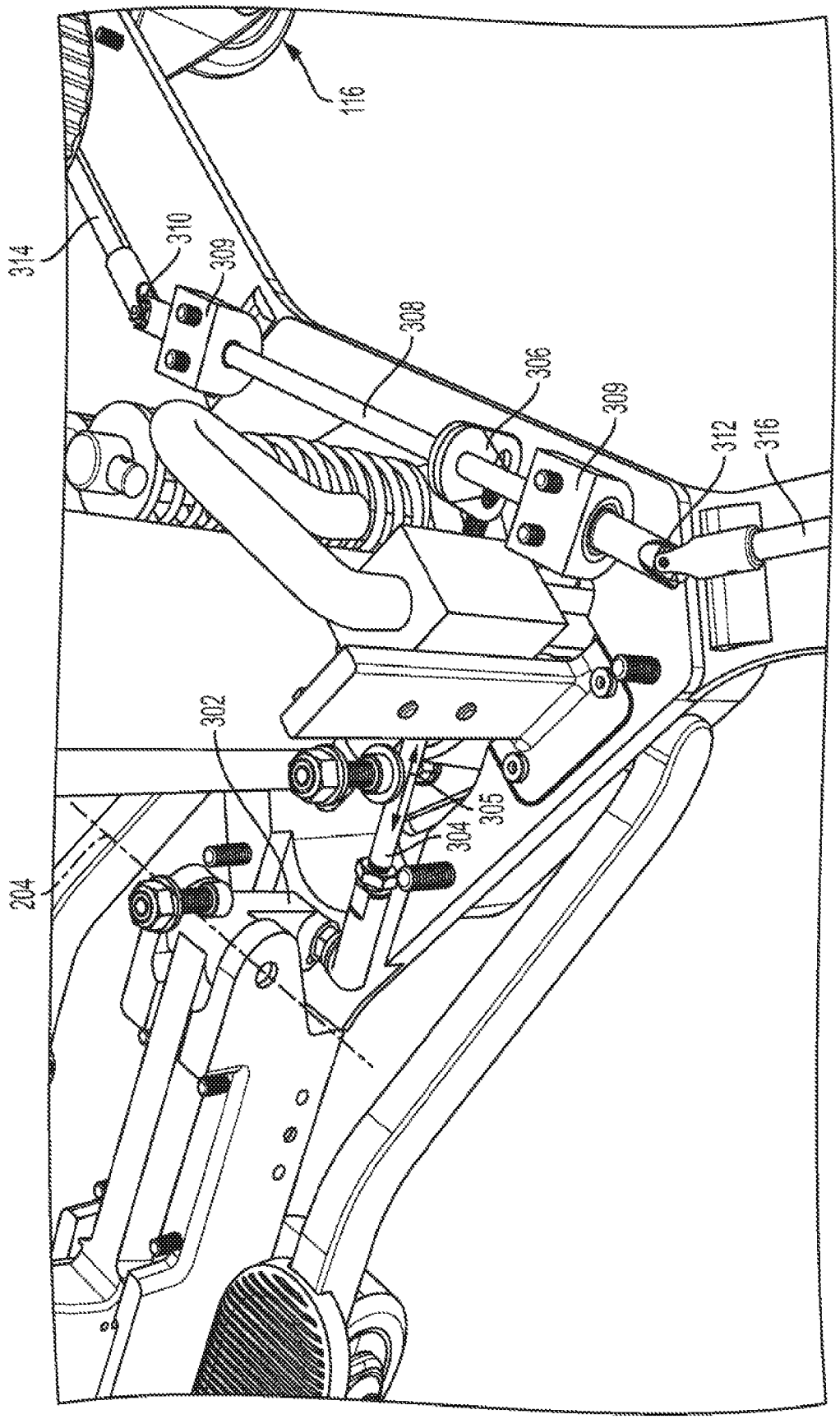
FIG. 3 is a different partial view of the braking assembly of FIG. 2.

Referring now to FIGS. 2 and 3, the brake switch 120 is illustrated without covering positioned there around. The brake switch 120 may be pivotally coupled to a frame 202 of the base section 108. More specifically, the brake switch 120 may be pivotally coupled to the frame 202 about a brake switch axis 204. The brake switch 120 may pivot about the brake switch axis 204 as it is repositioned between the disengaged and engaged position.

The brake switch 120 may also have a switch arm 302 extending radially away from the brake switch axis 204. As the brake switch 120 pivots about the brake switch axis 204, a pushrod 304 may be moved in a pushrod direction 305. The pushrod 304 may be a mechanical linkage from the switch arm 302 to an intermediate arm 306 that is coupled to and extends radially away from an intermediate shaft 308. The intermediate shaft 308 may be pivotally coupled to the base section 108 via one or more bearing or bushing assembly 309. The bearing or bushing assemblies 309 allow the intermediate shaft 308 to rotate as the pushrod 304 moves in the pushrod directions 305 responsive to movement of the brake switch 120. In short, as the brake switch 120 moves from the disengaged position to the engaged position, a torque is applied to the intermediate shaft 308.

The intermediate shaft 308 may have a first end with a first link 310 and a second end with a second link 312. The first link 310 may rotationally couple the intermediate shaft 308 to a first caster shaft 314 and the second link 312 may rotationally couple the intermediate shaft 308 to a second caster shaft 316. The first caster shaft 314 may extend to a braking assembly of the first caster assembly 116 and the second caster shaft may extend to a braking assembly of the second caster assembly 118. Both the first and second caster shaft 314, 316 may have one or more bearing or bushing positioned to rotationally couple the corresponding shaft 314, 316 to the base section. Further, both shafts 314, 316 may terminate at a corresponding brake arms that extend radially from the corresponding shafts 314, 316. The brake arms may contact a lock pin or plunger of the corresponding caster assembly 116, 118 to selectively apply a multi axis brake thereto.

In one aspect of this disclosure, as the brake switch 120 is transitioned from the disengaged position to the engaged position, the pushrod 304 may be moved in the pushrod direction 305 towards the intermediate shaft 308. In turn, the intermediate shaft 308 will rotate as the pushrod 304 moves the intermediate arm 306 therewith. The rotational motion of the intermediate arm 308 is transferred to the first and second caster shafts 314, 316 through the first and second links 310, 312. Finally, the rotational motion of the first and second caster shafts 314, 316 is transferred to a linear force acting on the lock pin or plunger via the brake arms at the corresponding first and second caster assemblies 116, 118.

The brake assembly described herein simultaneously applies a braking force to the first and second caster assemblies 116, 118 to prevent both rotation of the caster assemblies 116, 118 and rolling of the caster assemblies 116, 118. As a person having skill in the relevant art appreciates, locking two caster assemblies of a multi-caster base allows the base to be substantially restricted from any movement relative to an underlying surface. Accordingly, while a three caster assembly system is shown and described, this disclosure could also be applied to embodiments with more caster assemblies. Further still, a braking force may be applied to more than two caster assemblies utilizing the teachings of this disclosure. Accordingly, this disclosure contemplates applying the teachings discussed herein to any number of caster assemblies and applying the braking force to more or fewer caster assemblies then those described herein.

Figure 4:
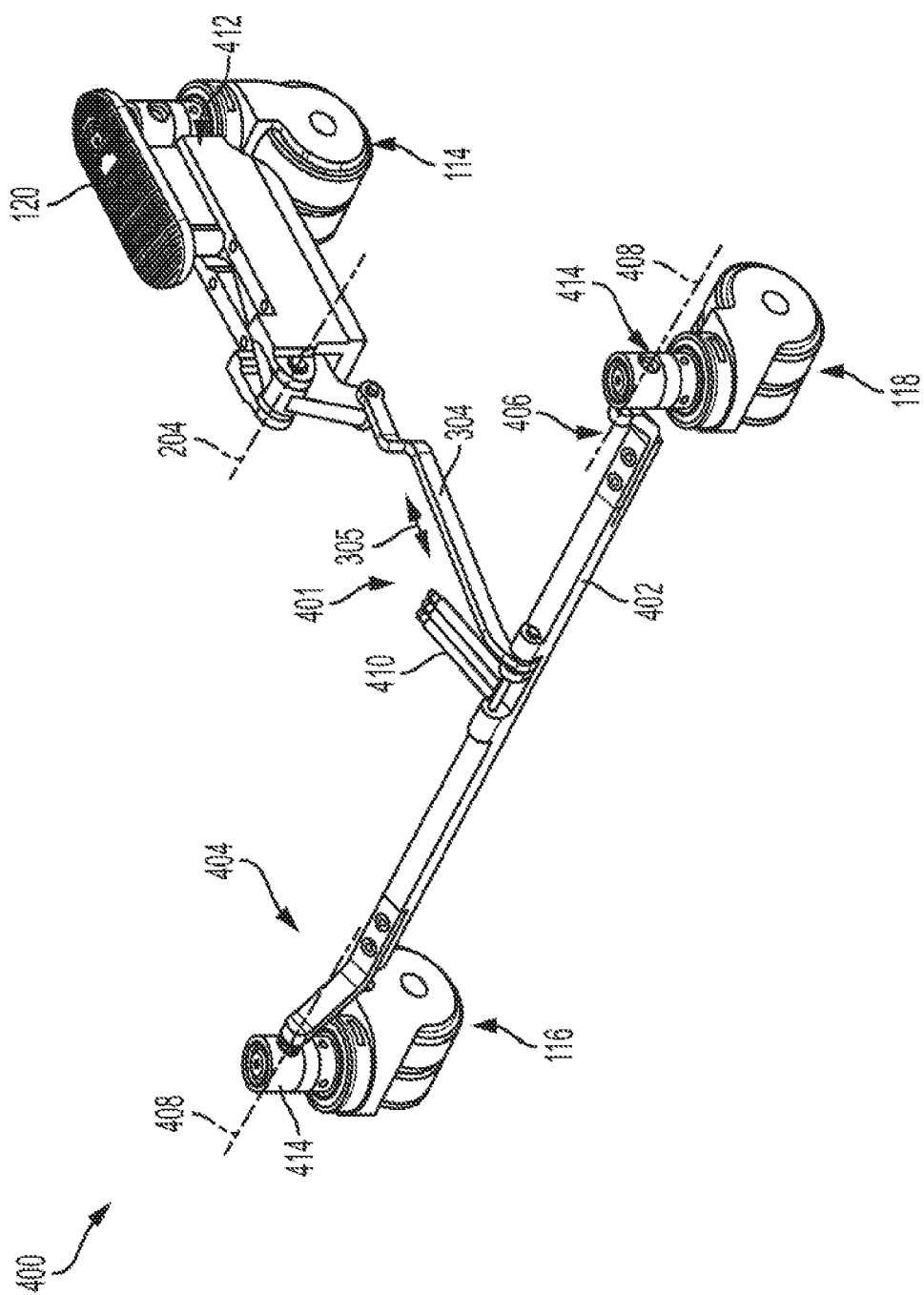
FIG. 4 is an elevated perspective view of another embodiment of a braking assembly.

Referring now to FIG. 4, another embodiment of a caster braking assembly 400 is illustrated with the support section removed. The caster braking assembly 400 may be part of the base section 108 of the wheeled seat 100 or part of any other device that has a caster assembly such as a surgical stool, wheeled bed, wheeled stand, or the like. Further, the caster brake assembly 400 may utilize the brake switch 120 and linkages 401 to selectively engage brakes of the caster assemblies 116, 118. More specifically, the brake switch 120 may pivot about the brake switch axis 204 to move the pushrod 304 in substantially the same way described herein with reference to FIG. 3. However, the caster brake assembly 400 of FIG. 4 pivotally couples the pushrod 304 to a cross member 402. The cross member 402 may be coupled to a first brake engagement assembly 404 on one end and to a second brake engagement assembly 406 on the other end. The first and second brake engagement assembly 404, 406 may be pivotally coupled to the corresponding first and second rear caster 116, 118 to pivot relative thereto about a brake axis 408.

In one aspect of this disclosure, the brake engagement assemblies 404, 406 may have a brake shaft that extends into the corresponding caster assembly 116, 118 to selectively apply a brake to the corresponding wheel of the caster assembly. In one non-exclusive example, the brake assembly 404, 406 may have a plunger or the like that is selectively applied against the wheels of the caster assembly to thereby prevent rotation of the wheels relative to the caster assembly. In this configuration, the pivotal location of the brake engagement assemblies 404, 406 may determine whether the plunger is applied to the corresponding wheels. In other words, the brake engagement assemblies 404, 406 may rotate about the brake axis 408 to selectively apply a braking force to the corresponding wheels of the caster assemblies 116, 118.

The cross member 402 may be offset from the brake axis 408 but otherwise coupled to the brake engagement assemblies 404, 406 to pivot about the brake axis 408. In this configuration, as the brake switch 12 is manipulated to move the pushrod in either direction 305, the cross member 402 may pivot about the brake axis 408 to thereby pivot the brake engagement assemblies 404, 406 to selectively apply the brakes of the caster assemblies 116, 118. Further, a return spring or springs 410 may be coupled to the cross member 402 on one end and to a frame member of the base section 108 on the other end. The return spring 410 may provide a springed force to the cross member 402 urging the cross member 402 to a released position wherein the caster assembly 116, 118 brakes are not applied. The brake switch 120 may be depressed to pivot about the brake switch axis 204 and move the pushrod 304 to overcome the spring force applied by the springs 410. As the brake switch 120 is depressed the pushrod 304 may pivot the cross member 402 about the brake axis 408 into a braked position wherein brakes of the brake assemblies 404, 406 are applied to the corresponding wheels.

In another aspect of this disclosure, the brake switch 120 may have a catch mechanism 412 therein to selectively maintain the brake switch 120 in the depressed position. The brake switch 120 may engage the catch mechanism 412 as it transitions towards the depressed position to thereby engage the catch mechanism 412 to hold the brake switch 120 in the depressed position until the catch mechanism 412 is released. The catch mechanism 412 may be released by applying an additional downforce on the brake switch 120 to release the brake switch from the depressed position and allow the brake switch 120 to pivot about the brake switch axis 204 to release the brakes of the brake engagement assemblies 404, 406.

In one non-exclusive example of this disclosure, the caster assemblies 116, 118 may be similar to the caster device illustrated and described in U.S. Pat. No. 4,722,114, the contents of which are hereby incorporated herein by reference. In this example, the brake engagement assemblies 404, 406 may have a polygonal shaft 414 or the like that acts as the operating tool for the caster to selectively reposition a spindle within the caster assembly 116, 118 to selectively apply a brake to the wheels thereof.

While a particular caster assembly is illustrated and discussed herein, this disclosure contemplates applying these teaching to any type of caster assembly wherein activating a single switch applies a braking force to multiple casters. Accordingly, many different types of caster assemblies may be coupled to the brake engagement assemblies 404, 406 to allow movement of the pushrod 304 to selectively apply brakes to the corresponding caster assemblies.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations)

Attached hereto and included with this application is an addendum including various additional descriptions and drawings depicting further aspects of some of the embodiments of the present disclosure. These attached materials are intended to comprise part of this application, and as such, their contents are hereby expressly incorporated by reference in their entirety herein.

The invention claimed is:

1. A caster braking assembly, comprising:
a base section;
a first caster assembly coupled to the base section and having at least one wheel;
a second caster assembly coupled to the base section and having at least one wheel;
a brake switch pivotally repositionable between an engaged position and a disengaged position; and
a third caster assembly coupled to the base section at a location at least partially under the brake switch;
wherein, when the brake switch is in the engaged position at least one wheel of both the first caster assembly and the second caster assembly are substantially restricted from rotating.

2. The caster braking assembly of claim 1, further comprising a switch arm coupled to the brake switch to pivot about a brake switch axis as the brake switch transitions between the engaged and disengaged position.

3. The caster braking assembly of claim 2, further comprising a pushrod pivotally coupled to the switch arm at one portion and pivotally coupled to a cross member at another portion.

4. The caster braking assembly of claim 3, further wherein the cross member is coupled to a first brake engagement assembly of the first caster assembly and to a second brake engagement assembly of the second caster assembly to selectively apply brakes to the corresponding wheels of the first and second caster assembly when the brake switch is in the engaged position.

5. The caster braking assembly of claim 4, further wherein the first and second brake engagement assemblies are pivotal about a brake axis and the cross member is offset from the brake axis.

6. The caster braking assembly of claim 1, further comprising a catch mechanism that selectively maintains the brake switch in the engaged position.

7. The braking assembly of claim 1, further comprising a support column and a seat section coupled to the base section.

8. The braking assembly of claim 7, further comprising a back section.

9. A method for manufacturing a braking wheeled assembly, comprising:
providing a plurality of caster assemblies pivotally coupled to a base section, a brake switch, and linkages;
pivotally coupling the brake switch to the base section to allow the brake switch to pivot between an engaged and disengaged position;
coupling the linkages between the brake switch and at least two of the plurality of caster assemblies to selectively engage brakes for each of the at least two plurality of caster assemblies when the brake switch is in the engaged position; and
pivotally coupling first and second position pedals to the base section to selectively alter the length of a support column, wherein the brake switch is positioned between the first and second seat position pedals.

10. The method of claim 9, further comprising selectively coupling a catch mechanism to the brake switch to selectively maintain the brake switch in the engaged position.

11. The method of claim 9, further wherein the linkages comprise a pushrod, a cross member, a first brake engagement assembly, and a second brake engagement assembly.

12. The method of claim 11, further comprising:
pivotally coupling the pushrod to the brake switch to move in a substantially linear direction as the brake switch transitions between the engaged and disengaged position; and
pivotally coupling the pushrod to the cross member to pivot the cross member about a brake axis that is offset from the cross member as the brake switch transitions between the engaged and disengaged position.

13. The method of claim 12, further wherein the first and second brake engagement assemblies are coupled to the cross member so pivotal movement of the cross member rotates both the first and second brake engagement assemblies.

14. The method of claim 13, further wherein each of the brake engagement assemblies have an operating tool defined along the brake axis and the operating tool of the first brake engagement assembly is positioned partially within a first caster assembly and the operating tool of the second brake engagement assembly is positioned partially within a second caster assembly wherein as the brake switch transitions from the disengaged position to the engaged position the operating tools rotate to engage brakes of the corresponding first and second caster assembly.

15. The method of claim 9, further comprising coupling a return spring to the linkages to apply a spring force to bias the brake switch towards the disengaged position.

16. The method of claim 9, further comprising pivotally coupling a front caster assembly to the base section at a location at least partially under the brake switch.

17. A surgical seat, comprising:
a seat section configured to support a user facing a front direction;
a base section configured to selectively roll along an underlying surface;
a support column coupling the base section to the seat section, the support column configured to be telescopically reconfigurable to alter the spacing of the seat section from the base section;
a front caster assembly pivotally coupled to the base section and extending in the front direction;
a first rear caster assembly pivotally coupled to the base section and configured to selectively brake a first caster wheel;
a second rear caster assembly pivotally coupled to the base section and configured to selectively brake a second caster wheel; and
a brake switch pivotally coupled to the base to be repositionable between an engaged position and a disengaged position;
wherein, when the brake switch is in the engaged position, brakes are applied to both the first caster wheel and the second caster wheel;
further wherein the brake switch is positioned at least partially above the front caster assembly.

18. The surgical seat of claim 17, further comprising linkages coupling the brake switch to the brakes of the first and second rear caster assemblies, wherein pivoting the brake switch from the disengaged position to the engaged position applies a torque to the first and second rear caster assemblies via the linkages to apply the corresponding brakes.

19. The surgical seat of claim 17, further comprising first and second seat position pedals pivotally coupled to the base section to selectively alter the length of the support column, wherein the brake switch is positioned between the first and second seat position pedals.

* * * * *